United States Patent [19]

Lederman

[11] Patent Number: 5,492,340
[45] Date of Patent: Feb. 20, 1996

[54] FLOATING DISK SEAL ASSEMBLY

[75] Inventor: Frederick E. Lederman, Sandusky, Ohio

[73] Assignee: General Motors Corporation, Detroit, Mich.

[21] Appl. No.: 247,202

[22] Filed: May 20, 1994

[51] Int. Cl.$^6$ .................................................. F16J 15/32
[52] U.S. Cl. .......................... 277/88; 277/65; 277/81 R; 277/92; 277/96.1
[58] Field of Search ................................. 277/35, 37, 38, 277/39, 40, 81 R, 88, 90, 96, 96.1, 96.2, 152, 65, 92

[56] References Cited

U.S. PATENT DOCUMENTS

| | | | |
|---|---|---|---|
| 2,486,088 | 10/1949 | Yaros | 277/38 |
| 2,572,422 | 10/1951 | Agger | 233/3 |
| 2,756,080 | 7/1956 | Andresen et al. | 277/40 |
| 3,137,237 | 6/1964 | Zagar et al. | 277/90 |
| 3,997,805 | 12/1976 | Dochterman | 277/88 |
| 4,413,831 | 11/1983 | Washida et al. | 277/40 |
| 4,497,495 | 2/1985 | Christiansen | 277/50 |
| 5,024,364 | 6/1991 | Nash | 277/35 |
| 5,045,048 | 9/1991 | Kaleskas et al. | 277/90 |
| 5,098,112 | 3/1992 | Petrak | 277/39 |
| 5,147,139 | 9/1992 | Lederman | 384/486 |
| 5,201,533 | 4/1993 | Lederman | 277/152 |
| 5,332,235 | 7/1994 | Fone et al. | 277/88 |

Primary Examiner—Daniel G. DePumpo
Attorney, Agent, or Firm—Patrick M. Griffin

[57] ABSTRACT

A seal assembly for a wheel spindle bearing is provided for use between its two relatively rotatable coaxial parts, and thus to seal the bearing chamber. The seal assembly includes an inner and outer annular casing, with at least one of the casings including a contact land. An annular sealing disk forms an extended area slip sealing interface against the contact land. The sealing disk is cross sectionally flat or L-shaped, and is urged into sealing contact with the contact land by an annular elastomeric spring defining a channel in cross section. The channel of the spring is formed by inner and outer axially extending resilient rings. The seal assembly can also include a second annular sealing disk that is urged into cooperating sealing contact with a second contact land.

2 Claims, 2 Drawing Sheets

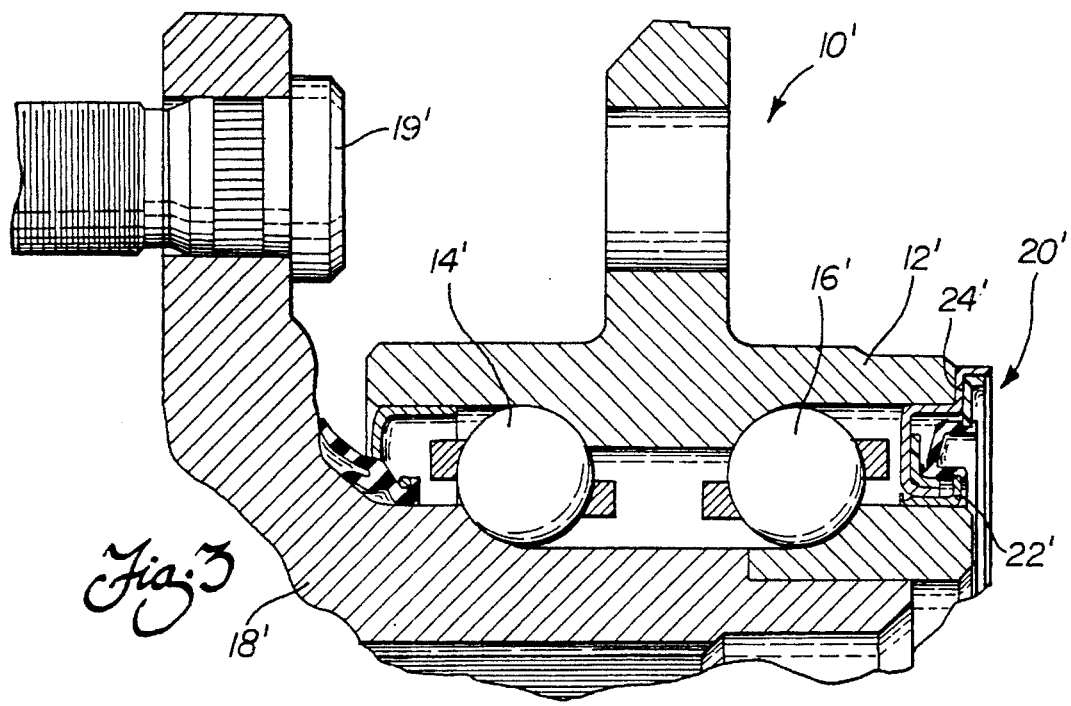
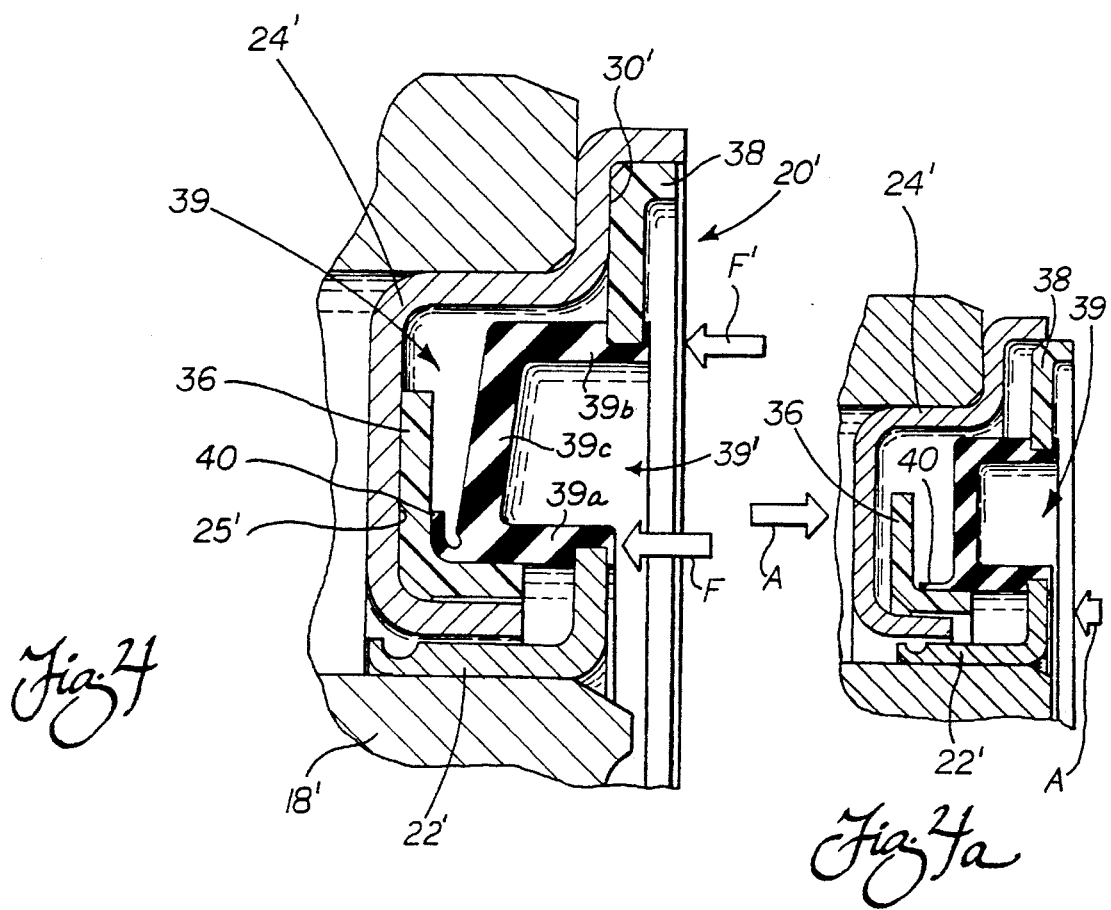

FLOATING DISK SEAL ASSEMBLY

TECHNICAL FIELD

The present invention relates to seal assemblies in general, and more particularly, to a seal assembly having a sealing plate-like disk that is biased into sealing contact with an adjacent seal casing to form an extended slip sealing interface along a circular contact land.

BACKGROUND OF THE INVENTION

In general, seal assemblies for a rotary bearing or the like, such as is used for sealing the wheel spindle assembly of a vehicle, are used to prevent entry of foreign material into the wheel spindle bearing, such as salt, road grime and other debris, and to prevent leakage of seal lubricant. To perform these functions, seal assemblies generally include at least one annular seal member attached to a seal casing, that in turn is biased against the opposite casing to form a sealing interface around a circular line of contact. This structure allows relative rotation between the coaxial, rotating component parts, while maintaining good sealing contact in satisfaction of the stated objective. The seals of the prior art seal assemblies are primarily formed of molded elastomer material such as rubber, but can also be made of less flexible, but lower friction materials, such as polytetrafloroethelene (PTFE).

In the recent prior art, it is common to provide both an inner and an outer annular casing with a flexible seal member supported in between. The seal member is attached to one casing and flexes against the opposite casing, and through the inherent memory of the seal material is biased into sealing contact. In this manner, the edge or lip of the seal member forms a single sealing interface along a circular line of contact. The casings are ring shaped and are formed of stamped metal with sufficient rigidity to be press fitted to respective inner and outer coaxial parts of the bearing assembly. It is also common in recent seal technology to provide seal assemblies having multiple flexible lips on a single seal member. In this manner, it is possible to provide a plurality of sealing interfaces along multiple circular lines of contact.

Although the use of flexed seal members as described above has been successful, seal assemblies that utilize this approach have been proven to be subject to some disadvantages. Especially in the area of wheel spindle technology, a seal assembly can experience rapid, axial and radial vibrations between the inner and outer casings. These vibrations can cause excessive deterioration of the seals along the circular lines of contact with the opposing casing. The deterioration can be accelerated by contact with abrasive or corrosive materials such as sand, salt or other materials that are commonly encountered in everyday use of a vehicle. Not only do corrosive materials such as salt cause deterioration to the seal structure, but as a secondary effect, it causes corrosion upon the annular lands against which the seal members rest. Rough contact between a seal lip and a corroded sealing surface results in further acceleration of the rate at which a seal member deteriorates. Once deterioration progresses sufficiently to allow contaminants to enter the bearing chamber and/or leakage of lubricant, rough bearing operation along with increased noise and heat, eventually occurs.

An example of a unitized seal assembly with multiple lip sealing members that has had success in use, but is subject to the above disadvantages, includes the seal assembly shown and described in U.S. Pat. No. 4,497,495, issued Feb. 5, 1985, and owned by the assignee of the present invention. As disclosed in this patent, the single seal is attached to the inner casing and has two lips having edges that engage the inside sealing surface of the outer casing. Corrosion of the sealing surface and/or vibration of the bearing assembly, can cause accelerated wear of the sealing edges of the lips. Eventually, this leads to deleterious seal leakage.

In addition to using flexible seal lips to engage a sealing surface, it is also known to utilize an annular diaphragm having an integral seal member with an edge that is biased into sealing contact with an adjacent sealing surface. An example of this type of seal includes U.S. Pat. No. 2,572,422 issued to Agger on Oct. 23, 1951.

The '422 patent discloses the use of an internal wave type annular compression spring to provide a strong compressive biasing force for urging an integral seal member into sealing contact with an adjacent sealing surface. This single sealing interface is formed along a circular line of contact and thus this assembly is subject to the above drawbacks. Since the sealing interface contacts the other casing along only a single, circular line of contact, vibrations of the seal assembly, as well as corrosion of the sealing surface can cause accelerated wear of the sealing edge. Thus, while this type of prior art seal assembly gives adequate levels of sealing effectiveness for short periods of time in a shielded environment, it leaves much to be desired in a hostile environment, such as encountered in protecting the bearing assembly of a vehicle wheel spindle assembly.

For the foregoing reasons and others, the need is identified to provide an improved seal assembly that is characterized by a highly effective, yet durable sealing interface. Indeed, the present invention discloses such an improvement wherein an extended area sealing surface of one or more annular disks offers a viable solution to the identified problems.

SUMMARY OF THE INVENTION

Accordingly, it is a primary object of the present invention to provide a seal assembly with improved sealing characteristics for use between two relatively rotatable coaxial parts.

Another object of the invention is to provide an improved seal assembly having at least one highly effective and durable seal member having an extended area seal interface.

Still another object of the invention is to provide an improved seal assembly, according to the foregoing objectives, having an elastomeric spring that urges one or more sealing plate-like disks in a balanced fashion into sealing contact against an adjacent annular sealing surface, to form a highly effective and durable extended area, floating sealing arrangement.

It is still another object of the present invention to provide such a seal assembly as described above and wherein the sealing plate is an annular disk, either flat or L-shaped in cross section, biased into sealing contact with an adjacent sealing surface by an elastomeric spring.

Still another object of the present invention is to provide a seal assembly having two seal members in the form of two annular sealing disks attached to an annular elastomeric spring to form two highly effective and durable extended area, slip sealing interfaces against adjacent sealing surfaces.

Finally, it is another object of the present invention to provide a seal assembly characterized by providing positive sealing contact between at least one annular sealing disk and a cooperating sealing surface through prestressing an annular elastomeric spring so that upon assembly the spring is deformed and by inherent memory urges the sealing disk against its respective sealing surface.

Additional objects, advantages and other novel features of the invention will be set forth in part in the description that follows, and in part will become apparent to those skilled in the art upon examination of the following description, or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a floating disk seal assembly is provided for sealing two relatively rotatable coaxial parts for protection in a relatively hostile environment, such as the bearings for the wheel spindle assembly of a vehicle. More particularly, the seal assembly includes inner and outer annular casings, with one casing including an extended contact land, against which an annular sealing disk forms an extended area slip sealing interface.

The annular casings are preferably stamped of relatively rigid metal so as to be self-supporting when press fitted on the respective coaxial parts. An elastomeric spring is attached to one of the casings, and defines a circular channel in cross section. More specifically, the elastomeric spring includes first and second axially extending resilient rings and a center annular cross member that connects the two rings forming a channel in cross section. The first ring in turn is attached to one casing for support of the elastomeric spring within the seal assembly.

In a first embodiment, the annular member is a cross sectionally flat, annular disk that is attached to an apex of the cross member of the annular elastomeric spring. The spring is prestressed so that upon assembly, the cross member is flexed by compression of the first resilient ring. This compression caused by the inherent memory of the seal structure urges the flat sealing disk into sealing contact with the contact land of the opposite casing.

In addition, the seal assembly includes a second annular sealing disk that is also cross sectionally flat and which extends radially from the second resilient ring of the spring. The second resilient ring is flexed or stretched under tension, in effect balancing the force within the elastomeric spring, to urge the second annular disk into sealing contact with a second contact land on the opposite casing. Thus through interacting compression and tension, respectively, first and second extended area slip sealing interfaces are formed.

In a second embodiment of the invention, the annular seal member is L-shaped in cross section providing a sealing disk with radial and axial annular portions; the radial portion being urged into sealing contact with the adjacent contact land, by compression of the elastomeric spring. An annular extension of the first resilient ring coupled with the axial portion provides a unique pilot function against a lip of the casing in this embodiment thus making the seal radially insensitive.

In addition, a second cross sectional L-shaped sealing disk is secured to the second resilient ring of the elastomeric spring. As with the first ring, the axially extending portion serves as a radial pilot by interaction against a second axial lip of the casing. As in the first embodiment of the invention, the annular elastomeric spring is prestressed so that upon assembly, compression of the first ring is operative to form the slip sealing contact of the first sealing disk with the casing; whereas, tension that substantially balances the compression within the elastomeric spring urges the second sealing disk into the sealing contact.

Thus, in both embodiments, two highly effective and cooperative floating seal members are provided. Preferably, the sealing disks are PTFE and are thus self-lubricating. The elastomeric spring is so positioned in both embodiments between the two sealing disks so as to in itself form a barrier to further enhance the sealing effectiveness.

Both versions of the seal assembly provide positive sealing action by forming two extended area slip seal interfaces. As compared with sealing interfaces of the prior art having only a circular line of sealing contact, the extended area of these sealing interfaces is highly effective and durable, as well as being economical to manufacture and easy to install.

Still other objects of the present two inventions will become readily apparent to those skilled in this art from the following description wherein there is shown and described two embodiments of this invention, simply by way of illustration of two of the modes best suited to carry out the invention. As it will be realized, the invention is capable of still other and different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 3 is a cut away cross sectional view of a typical wheel spindle bearing assembly illustrating a second or alternate embodiment of the floating disk seal assembly of the present invention;

FIG. 4 is a cut away cross sectional view, enlarged to show more detail of the second embodiment of the floating disk seal assembly in position for use; and FIG. 4a is a partially assembled cross-sectional view of the second embodiment seal assembly of FIG. 4.

The following detailed description includes a description of these two alternate embodiments of the present invention.

DETAILED DESCRIPTION OF THE PREFERRED EMBODIMENT

Figure 1:
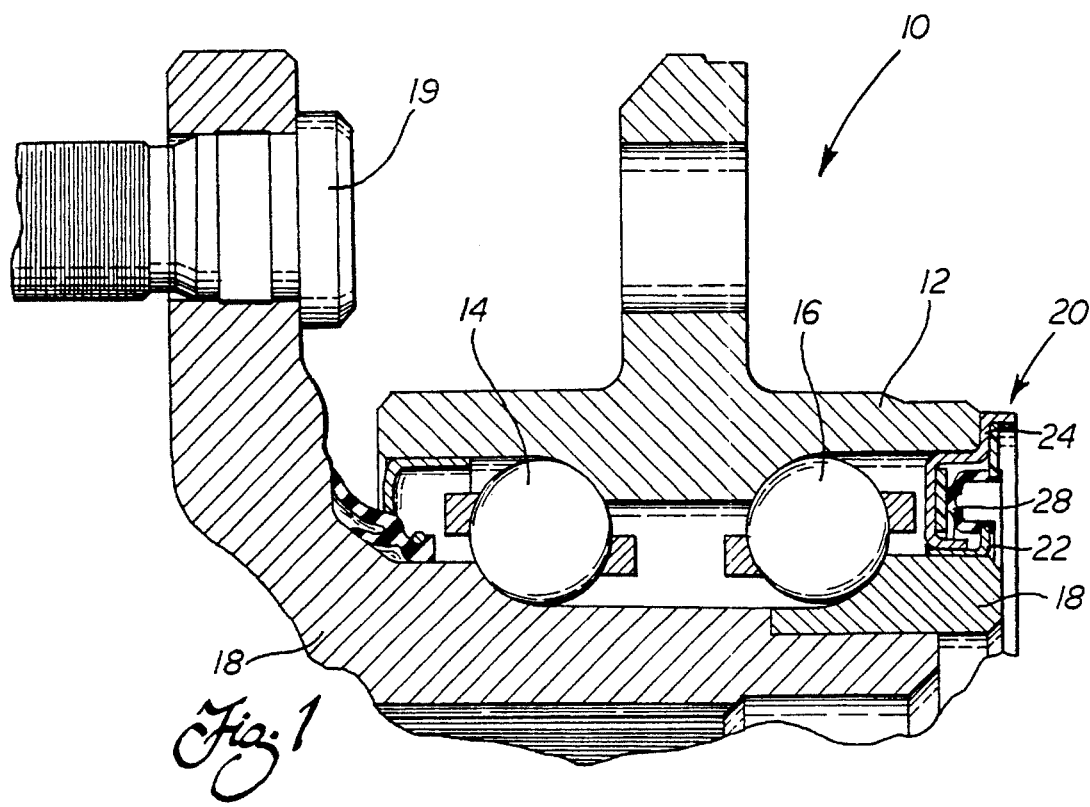
FIG. 1 is a cut away partial cross sectional view of a typical wheel spindle bearing assembly, including the floating disk seal assembly of the first embodiment of the present invention.

Reference is now made to FIG. 1 of the drawings illustrating a cut-away view of a typical wheel spindle bearing assembly 10 including a support ring 12, which may be attached to a fixed portion of a vehicle (not shown). A pair of antifriction bearings 14, 16 provide rotary support for spindle 18. As is well understood in the art, the spindle 18 in turn supports the wheel (not shown) of the vehicle by a plurality of mounting studs 19. A floating disk seal assembly, generally designated by the reference numeral 20, and formed in accordance with the principles of the present invention, seals the inside lubricated chamber of the spindle assembly 10. It will be understood by those skilled in the art and in accordance with the present description, that the floating disk seal assembly 20 of the present invention is particularly adapted for use in this environment. The extended area slip sealing interfaces provided are durable and highly effective, as will be explained further and in detail. It is understood that the seal assembly 20 can be used in many environments to protect other types of bearing assemblies, or any other rotatable coaxial parts.

Figures 2, 2A:
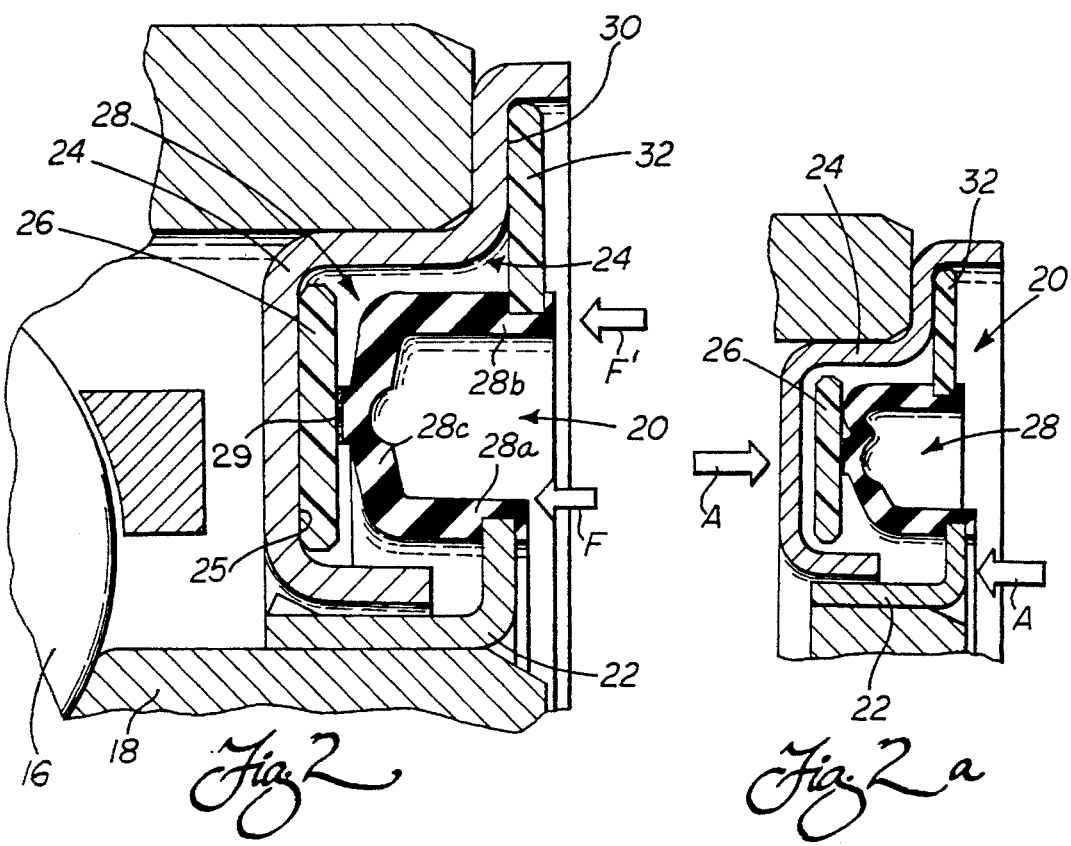
FIG. 2 is a cut away cross sectional view, enlarged to show more detail of the first embodiment of the floating disk seal assembly in position for use.
FIG. 2a is a partially assembled cross-sectional view of the first embodiment of the seal assembly of FIG. 2.

In accomplishing the aforementioned objectives, the floating disk seal assembly 20, as best shown in FIG. 2, includes an inner annular casing 22, that is preferably press fitted onto the wheel spindle 18. Similarly, an outer annular casing 24 is press fitted into the inside of the support ring 12. Outer casing 24 includes a radially extending contact land 25, that provides the sealing surface for engagement by the first, improved plate-like sealing disk of the present invention, as will now be described.

Specifically, with respect to this embodiment of the invention, a generally flat annular sealing disk 26 forms an extended slip sealing interface along the opposed sealing surface of the circular contact land 25. The sealing disk 26 is preferably formed of a plastic material, such as polytetrafloroethelene (PTFE), in order to reduce friction along this annular sealing interface which it provides. By widening the area of contact from a line contact that is common in the prior art where sealing lips are employed, as described above, improved wear characteristics are achieved, and at the same time the PTFE structure of the disk 26 reduces friction, further improving the wear characteristics, and resulting in an increased useful life of the seal assembly 20.

An annular elastomeric spring 28 constantly urges the flat sealing disk 26 into positive sealing contact with contact land 25. As illustrated, the spring 28 defines a circular channel in cross section, and includes inner and outer axially extending resilient ring sections 28a, 28b. The inner ring section 28a is secured in position to the inner casing 22, and the outer resilient ring section 28b is in turn, secured to the inner ring 28a by a center annular cross member 28c. As indicated above and as will be subsequently explained in detail, this novel elastomeric spring 28 provides an excellent way to generate biasing force F for urging the sealing disk 26 against contact land 25.

In this first embodiment, the cross member 28c is preferably attached at an apex 29, to sealing disk 26 by a substantially continuous ring of adhesive. This attachment allows the sealing disk 26 to float within the confines of the casing 24, and thus remain in flat sealing contact against the contact land 25. The edges of the disk 26 acting against the axially extending sections of the casing 24 perform a radial piloting function. Because of this arrangement, axial and radial vibrations that have caused problems of deterioration in the past due to bending and flexure of the seal, are no longer a problem or concern. The extended area/floating action allows the disk 26 to remain in full sealing contact at all times.

To further facilitate effective sealing action, it is also contemplated that a second generally flat, annular sealing disk 32 be provided between the two coaxial parts. This second sealing disk 32 forms an additional extended area, flat sealing interface along a second contact land 30 of the outer casing 24. Specifically, the sealing disk 32 is secured to the second resilient ring 28b of the elastomeric spring 28 and extends radially therefrom. As with the first sealing disk 26, this novel spring 28 provides an excellent way of providing the biasing force F' for urging the sealing disk 32 against contact land 30.

With reference now to FIG. 2a, the force F exerted by spring 28 will be more fully explained. As can be seen from this pre-assembly illustration, the finished molded structure of the spring causes the inner portion of the cross member 28c to be compressed during final assembly (see opposite action arrows A). That is, because of the distorted or asymmetrical molded form of the spring's cross section, contact of the sealing disk 26 with contact land 25 compresses and flexes the cross member 28c, and in turn the first resilient ring 28a. In this manner, and by overcoming the inherent memory of the cross member 28c and the ring 28a just the right amount of biasing force F can be built in so as to urge the sealing disk 26 into reliable, positive sealing contact with the contact land 25.

Further, contact of the second sealing disk 32 with contact land 30, places in tension the outer portion of the compressed cross member 28c and second resilient ring 28b. Again, the inherent memory of the spring 28 generates the biasing force F' to urge the sealing disk 32 into positive sealing contact with the contact land 30. The compressive and tensioning forces F and F' tend to balance each other providing the final symmetrical form shown in FIG. 2. To match the desired forces F, F' of the two interfaces, all that needs to be done is modify the initial shape of the spring 28 (see FIG. 2a).

As with the disk 26, the floating action of the disk 32 is self centering due to the radial piloting action of its edge with the outer lip of the casing 24. Also, as can be seen best in FIG. 2, the spring 28 itself forms a barrier preventing either inward or outward migration of fluids and/or particulate matter. It is also clear that one or both disks 26, 32 can be used in certain environments without departing from the broader principles of the invention. However, as will be realized, when using the two disks 26, 32 in tandem, as preferred, with the unique substantially balancing compressive/tensioning forces F, F', a highly effective sealing arrangement that departs from the prevalent teaching of the prior art is realized.

Reference will now be made to FIGS. 3 and 4 detailing the second or alternate embodiment of the present invention.

FIG. 3 is similar to FIG. 1 in that it shows a wheel spindle bearing assembly 10' including a support ring 12', antifriction bearings 14', 16', and spindle 18'. The floating disk seal assembly 20', positioned between inner/outer casings 22', 24', is formed in accordance with the present invention, to function in the same manner, but as to structural details is different.

To further understand the novel details of this second embodiment, reference is made to FIG. 4, showing an enlarged cut away, cross sectional view of the seal assembly 20'. The outer casing 24' includes annular contact lands 25' and 30', which cooperate with first and second sealing disks 36, 38, respectively. The sealing disks 36, 38 are L-shaped in cross-section, each having a peripheral, axially extending pilot rim, and each forming an extended area L-shaped sealing interface against contact lands 25' and 30'.

In order to ensure effective and continuous sealing contact of the first and second L-shaped sealing disks 36, 38 against contact lands 25', 30', an annular elastomeric spring member is provided. The structure of this elastomeric spring 39' defines a channel in cross section, and includes inner and outer axially extending resilient rings 39a, 39b. The inner casing 22' secures the inner resilient ring 39a in position and in turn, the outer resilient ring 39b is secured to the inner ring by an annular cross member 39c. While the cross member 39c is structurally dissimilar to the equivalent cross member 28c, the same function to bring about substantially the result is realized. Additionally, the first or inner ring 39a includes an annular extension 40 of reduced thickness, the function of which will be described more in detail below.

By reference now to FIGS. 4 and 4a, showing a fully assembled and partially assembled seal assembly 10 respectively, the sealing function carried out by the L-shaped sealing disks 36, 38 can be more fully understood. Prior to full assembly, the annular extension 40 is extended in a ring-shaped, substantially axially extending position. Upon assembly, the casings 22, 24 are moved together as shown by opposite action arrows A, causing the annular extension 40 to flex and the ring 39a to be compressed against L-shaped sealing disk 36. The inherent memory of these portions of the spring 39 are operative to resist this flexing action, thus causing the sealing force F to be exerted urging the sealing disk 36 into sealing contact with contact land 25'. In this manner, an L-shaped extended area slip sealing interface is formed in satisfaction of the objectives of the invention.

The force F' is also exerted on sealing disk 38. Prior to full assembly, cross member 39c' is preformed in a substantially orthogonal position relative to the first and second resilient rings 39a, 39b. Upon full assembly, the casings 22, 24 are moved together as previously mentioned, and this action causes the sealing disk 38 to thus also be pulled against its contact land 30'. This causes flexure with partial compression/tension in cross member 39c and tension of the second ring 39b. Thus, the inherent memory of the cross member, and balanced compression/tension of the rings 39a, 39b, causes forces F, F' to be exerted on the sealing disks 36, 38, thereby urging them against contact lands 25, 30. In this manner, both the first and second L-shaped extended area sealing interfaces are formed along the contact lands 25', 30'.

Additional advantages are achieved by the use of the L-shaped sealing disks 36, 38. Each sealing disk 36, 38 includes the axially extending peripheral rims that first facilitate easy transition of the seal assembly 20' from its unassembled to assembled state (see FIG. 4a). Specifically, these peripheral rims cooperate with the corresponding axially extending portions of the casings 22', 24'. This piloting feature assures that the sealing disks 36, 38 are radially insensitive during operation. Also, with respect to all other features, this second embodiment shares the same advantages as the embodiment of FIGS. 1–2a.

In summary, the present invention as embodied in the described seal assemblies 20, 20', is an exceptional advance in the art in both seal effectiveness and durability. The extended slip sealing interfaces provide superior contact barriers against the exit of lubricant, or the entrance of contaminants into the bearing. The sealing disks 26, 32 and 36, 38 exhibit a floating characteristic providing self centering piloting action. They are self lubricating, and the seal assemblies 20, 20' provide especially effective, balanced compression/tension forces F, F' of the elastomeric spring 28, 39 to assure seal reliability. Furthermore, each spring 28, 39 due to its geometric shape forms a supplemental barrier to passage of fluids and/or particulate matter. These features also make the seal assemblies 20, 20' highly resistant to deterioration caused by vibration.

The foregoing description of two preferred embodiments of the invention has been presented for purposes of illustration and description. They are not intended to be exhaustive or to limit the invention to the precise forms disclosed. Obvious modifications or variations are possible in light of the above teachings. These embodiments were chosen and described to provide the best illustrations of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

The embodiments of the invention in which an exclusive property or privilege is claimed are defined as follows:

1. A seal assembly for sealing inner and outer relatively rotatable coaxial parts comprising:

inner and outer annular casings fixed in position with respect to the coaxial parts, one of said casings including first and second radially extending contact lands;

an annular elastomeric spring defining a channel in cross section, said spring including first and second substantially axially extending resilient rings and a center annular cross member;

means for securing said first resilient ring of said annular spring to the other of said casings;

a first radially extending annular sealing disk forming a first extended area slip sealing interface against said first contact and attached to said elastomeric spring channel so as to be compressed into contact with said first land to form said first sealing interface;

a second radially extending annular sealing disk forming a second extended slip sealing interface against said second contact land and extending radially from said second resilient ring so as to be flexed by tension in said second resilient ring into contact with said second land to form said second sealing interface;

whereby the extended slip sealing interfaces of said first and second sealing disks, provide balanced, enhanced sealing effectiveness and durability.

2. A seal assembly as in claim 1, wherein said spring is prestressed by flexure during installation to provide positive sealing forces at said interfaces.

* * * * *